United States Patent [19]

Buchanan

[11] 4,283,454

[45] Aug. 11, 1981

[54] PAPERMAKERS WET FELT WITH RIBBED AND SMOOTH SURFACE TEXTURES

[75] Inventor: Robert D. Buchanan, Wilson, N.C.

[73] Assignee: Porritts & Spencer Inc., Wilson, N.C.

[21] Appl. No.: 119,841

[22] Filed: Feb. 8, 1980

[51] Int. Cl.$^3$ .............................................. B32B 5/06
[52] U.S. Cl. ..................... 428/233; 28/107; 28/112; 34/243 F; 156/148; 162/DIG. 1; 162/358; 428/234; 428/246; 428/252; 428/257; 428/258; 428/259; 428/280; 428/282; 428/284; 428/300
[58] Field of Search ................ 28/112; 156/148; 428/233, 234, 235, 236, 246, 251, 257, 258, 300, 252, 280, 282, 284; 162/DIG. 1, 358; 34/243 F

[56] References Cited

U.S. PATENT DOCUMENTS

| 21,890 | 8/1941 | Walsh et al. | 428/234 |
|---|---|---|---|
| 1,722,764 | 7/1929 | Rasch | 428/234 |
| 2,013,620 | 9/1935 | Ashby | 428/233 |
| 2,165,772 | 7/1939 | Walsh et al. | 428/234 |
| 2,766,158 | 10/1956 | Rinecker | 428/234 |
| 3,086,276 | 4/1963 | Bartz et al. | 428/300 |
| 3,613,258 | 10/1971 | Jamieson | 162/358 |
| 3,657,068 | 4/1972 | Ivanowicz | 139/383 A |
| 4,070,519 | 1/1978 | Lefkowitz | 428/235 |
| 4,119,753 | 10/1978 | Smart | 428/234 |
| 4,151,323 | 4/1979 | Christie | 428/234 |

FOREIGN PATENT DOCUMENTS 1232949  5/1971  United Kingdom .................. 428/234

Primary Examiner—James J. Bell
Attorney, Agent, or Firm—Fleit & Jacobson

[57] ABSTRACT

A papermakers wet felt comprising a three layer fabric having a first or lower layer which defines a machine roll contacting surface, a second or intermediate layer, and a third or top layer which defines a paper-receiving surface. The lower layer is woven of machine direction yarns which are of much greater diameter than the cross machine direction yarns. The intermediate layer is also woven, and adds stability and strength to the felt while providing void areas for drainage. The top layer comprises a batt or fleece of non-woven batting material.

Also disclosed is a method of making the papermakers felt wherein the lower and intermediate cloths are separately woven and then associated with each other so that the inner surface of the intermediate layer contacts the outer surface of the bottom layer. The associating of the two layers takes place on a conventional fiber locker or needling machine associated with a conventional stretching device. When both of the cloths have achieved substantially the same length, the non-woven web of synthetic fibers is needled into two cloths through the use of the needling machine to produce the composite three-layered papermakers felt.

26 Claims, 7 Drawing Figures

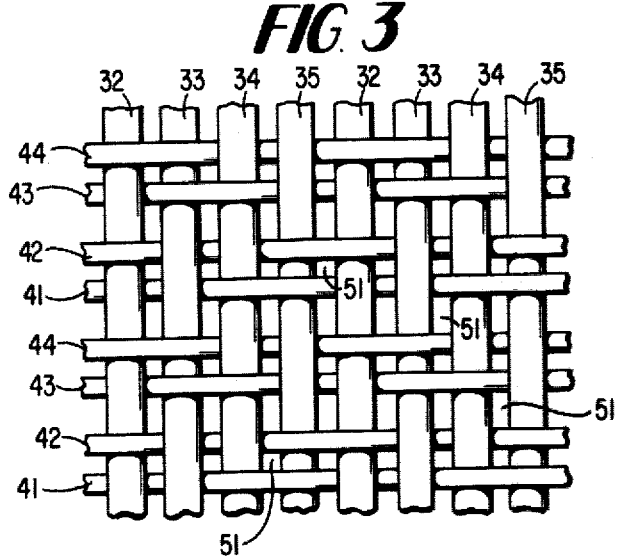
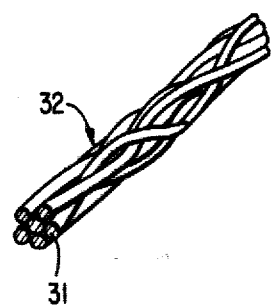
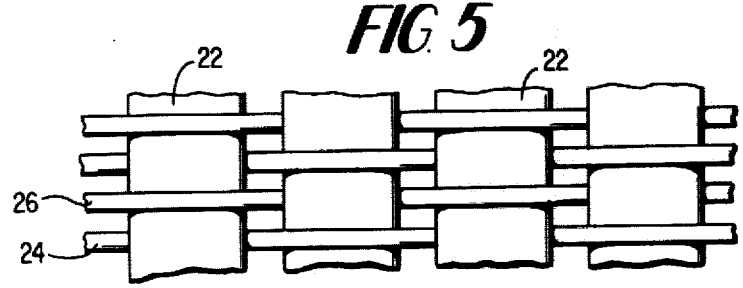
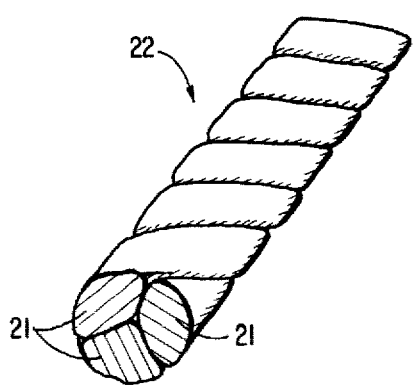
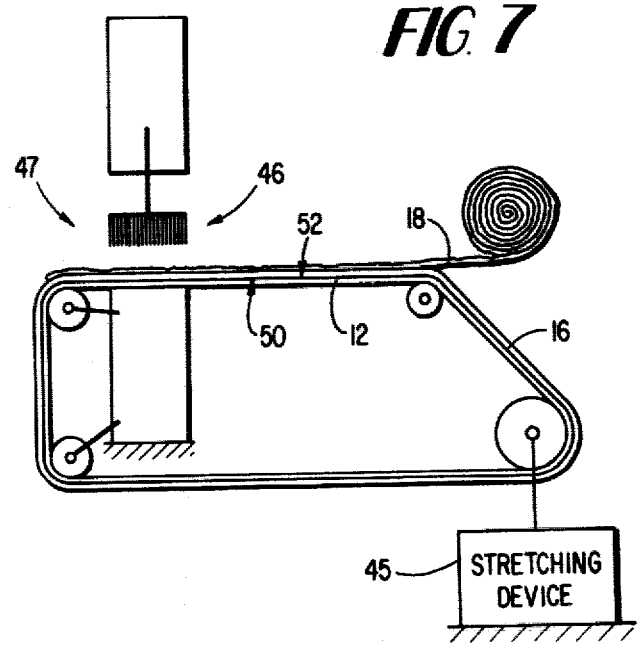

PAPERMAKERS WET FELT WITH RIBBED AND SMOOTH SURFACE TEXTURES

BACKGROUND OF THE INVENTION

1. Field of the Invention

The present invention relates to papermakers felts in general, and to a papermakers wet felt having a smooth paper-receiving surface and a ribbed machine roll contacting surface.

2. Background of the Prior Art

Ideally, a papermakers wet felt should comprise an endless belt having a smooth paper-receiving surface for importing a smooth finish to a paper sheet that is being transported thereon, and an abrasive resistant machine roll contacting surface for draining water from the paper sheet and for coacting with the machine roll to advance the paper sheet to the next stage in the papermaking process. Because of the high speeds and tremendous roll pressures developed by today's papermaking machines there is a tendency for papermakers wet felts to mark the paper sheets as they pass through the nip of a machine press and to wear excessively on the roll contacting surface as it passes over the machine rolls, suction boxes, and other machine elements.

Originally, papermakers wet felts were made of a woven cloth, having a woolen spun yarn in both the machine direction and the cross machine direction. As the speed of paper production increased, such cloths were found to be inadequate. Performance of the original woven cloth papermakers felt was greatly improved through the inclusion of synthetic fibers in the spun yarns. Subsequently, improvements included the emergence of batt-on-base felts, where a fibrous batt or fleece composed of non-woven fibers is needled to a woven base cloth. This development was followed by the batt-on-mesh felt, where essentially the same fabric is produced but the base cloth is non-compressible. A preferred method of producing the non-compressibility in the base cloth is to use resin impregnated, plied multifilament yarns in both the machine direction and the cross machine direction or to use monofilament yarns for the cross machine direction and machine direction threads. The non-compressibility of the base cloth provides void areas which accept water from the paper sheet as it passes through the nip of the paper machine press and transports the water forward to a suction box for removal. However, because the base cloth is resin treated for stiffness rather than strength, there is still a problem of abrasion wear against the machine rolls. In addition, a complex weaving structure is needed to generate a base cloth having the necessary void areas coupled with the proper rib structure for machine roll contact.

It has been found that a batt-on-mesh felt, which has batt fiber added only to the paper receiving surface of the felt, will provide better water removal on the paper machine than a felt which has batt added to both the paper-receiving surface and the roll contacting surface of the papermakers felt.

A papermakers felt, as used in the papermaking process, must receive, transport and remove water. At the same time the felt must provide a smooth paper receiving surface in order to produce a paper which does not suffer from marking problems. Further, the felt must also act to support the paper, while at the same time facilitating draining.

It has been observed that the prior art papermakers felts suffer from one or more of the following problems: excessive wear of the felt on the machine roll surface, paper marking problems, inadequate drainage capabilities, and premature belt failure.

There is thus a need for an improved wet felt which minimizes the problems associated with the prior art felts. The present invention is directed toward filling that need by providing a composite cloth having a smooth paper-receiving layer of non-woven batting material, an intermediate woven layer of synthetic yarns to impart strength to the felt while also providing void areas for drainage, and a bottom woven layer of ribbed construction to provide an abrasion resistant machine element contacting surface and a superior drainage structure.

SUMMARY OF THE INVENTION

The present invention relates to an improved papermakers wet felt and a method of making same. The felt basically comprises a three layer fabric having a first or lower layer which defines a machine roll contacting surface, a second or intermediate layer, and a third or top layer which defines a paper-receiving surface.

The lower or bottom layer comprises a cloth woven endless from a plurality of machine direction and cross machine yarns, the individual machine direction yarns being of much greater diameter than the individual cross machine direction yarns so that the resultant cloth or layer defines the machine roll contacting surface as a series of alternating machine direction ribs and machine direction grooves. The ribs contribute to reduce abrasion and the grooves promote water removal.

The intermediate layer, which adds stability and strength to the felt while providing void areas for drainage, comprises a cloth woven from a plurality of machine direction yarns and cross machine direction yarns. In the intermediate layer, the cross machine direction yarns are typically made from a monofilament nylon, while the machine direction yarns are typically made from either a monofilament or a multifilament nylon.

The top layer comprises a batt or fleece of non-woven batting material such as synthetic fibers or blends of synthetic and wool fibers which are customarily used in the manufacture of papermakers felts.

In making the papermakers felt according to the teachings of the present invention, the bottom and intermediate cloths are separately woven and then associated with each other so that the inner surface of the intermediate layer contacts the outer surface of the bottom layer. The associating of the two layers takes place on a conventional fiber locker or needling machine that has associated with it a conventional stretching device. The stretching device is employed in an operation wherein the two cloths in association with each other stretch under tension until the two cloths are substantially the same length. When both of the cloths have achieved substantially the same length, the non-woven web of synthetic fibers is needled into the two cloths through the use of the needling machine, which has a series of barbs or needles to accomplish the needling operation and produce the composite three-layered papermakers wet felt embodying the subject invention.

Thus, it is an object of the present invention to provide an improved papermakers wet felt.

It is another object of the present invention to provide a papermakers felt in which paper marking and machine element abrasion are reduced while water drainage is enhanced.

It is a further object of the present invention to provide a papermakers felt of composite structure including a smooth paper-receiving layer of non-woven batting material, an intermediate woven layer of synthetic yarns to impart strength to the felt while providing void areas for drainage, and a bottom woven layer of ribbed construction to provide an abrasion resistant machine element contacting surface and a superior drainage structure.

It is still another object of the present invention to provide an improved method for making a papermakers wet felt.

It is yet another object of the present invention to provide an improved method of making a papermakers wet felt in which less complex weaving structures are used to generate the felt.

Additional objects and advantages of the present invention will become apparent from a reading of the specification and claims in which preferred but not necessarily the only forms of the invention will be described in detail, taken in connection with the drawings accompanying and forming a part of the application.

BRIEF DESCRIPTION OF THE DRAWINGS

FIG. 3 is a top plan view of a portion of the intermediate layer illustrated in FIG. 2.

FIG. 4 is a perspective view of a portion of a machine direction yarn found in the intermediate layer.

FIG. 5 is a top plan view of a portion of the bottom layer illustrated in FIG. 2.

FIG. 6 is a perspective view of a portion of a machine direction yarn found in the bottom layer.

FIG. 7 is a diagrammatic illustration used to explain a method for making the papermakers felt of FIG. 1.

DETAILED DESCRIPTION OF THE DRAWINGS

Figure 1:
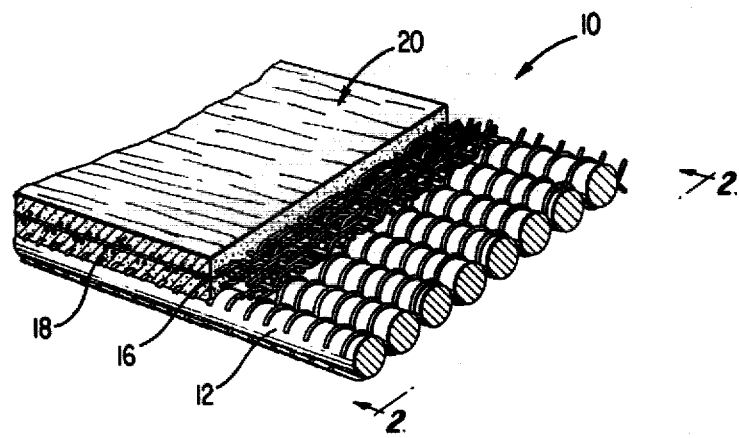
FIG. 1 is a perspective view, partially cut away, of a portion of a papermaker's wet felt embodying the subject invention.
Figure 2:
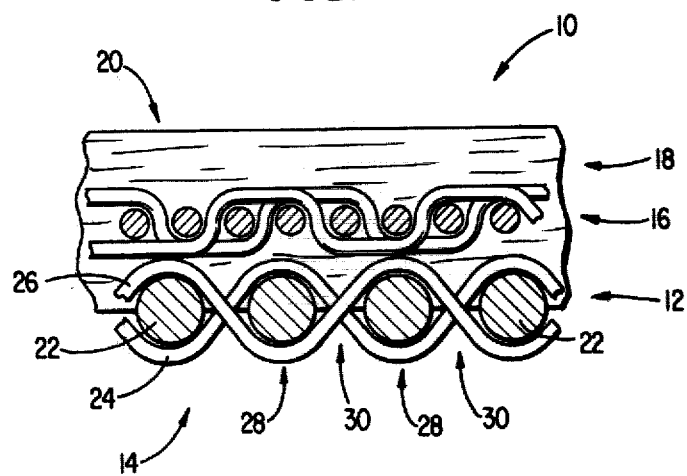
FIG. 2 is a section viewed along line 2—2 of FIG. 1.

With reference to FIGS. 1 and 2, a portion of a papermakers felt embodying the subject invention is generally designated as 10. The felt 10 basically comprises a three layer fabric having a first or lower layer 12 which defines a machine roll contacting surface 14, a second or intermediate layer 16, and a third or top layer 18 which defines a paper-receiving surface 20. As used herein, the terms machine direction, cross machine direction, inner surface, and outer surface are applied with reference to the wet felt in its position of intended use.

With particular reference to FIGS. 2, 5, and 6, the lower or bottom layer 12 comprises a cloth woven endless from a plurality of machine direction yarns 22 and cross machine direction yarns 24 and 26. The diameters of the machine direction yarns 22 are selected to be much greater than (preferably a minimum of twice) the diameters of the cross machine direction yarns 24, 26 so that the resultant cloth or layer defines the machine roll contacting surface 14 as a series of alternating machine direction abrasion-resisting ribs 28 defined by the machine direction yarns 22, and machine direction drainage grooves 30.

In a preferred embodiment, the machine direction yarns 22 and the cross machine direction yarns 24, 26 are woven endless in accordance with any of the well-known weave patterns on a conventional loom with a plain weave being preferred. The cloth is woven so that the machine direction yarns remain essentially straight with substantially all crimping taking place in the cross machine direction yarns. This type of structure more precisely defines the grooves 30 for enhanced water conveyance during drainage. Thus, it can be seen that the frequency of the ribs 28 and the widths of the grooves 30 are determined by the weave pattern. It is contemplated to also produce the bottom layer 12 by the flat weave process, in which case, the fabric ends are subsequently joined by any well known method including hand joining.

Preferably, the cross machine direction yarns are spun polyester of very fine count on the order of a 78 Tex count, with a preferred range of approximately 50 to 120 Tex. The machine direction yarns are bulky spun nylon or spun nylon and nylon multifilament combinations, typically in two or three ply form with a Tex count of 1,004 and a preferred range of approximately 800 to 1200 Tex. Yarns of polyester fiber content may also be used to form the machine direction yarns, and the fabric may be woven flat, although the endless method is preferred. An example of a yarn found suitable for use in the machine direction is shown in FIG. 6, wherein three plys or threads 21 of bulky spun nylon are twisted together to form yarn 22.

The intermediate layer 16, as shown in FIGS. 2-4, comprises a cloth woven from a plurality of machine direction yarns 32-35 and cross machine direction yarns 41-44. The cloth is woven to define drainage apertures or interstices 51 throughout the cloth. In the intermediate layer, the cross machine direction yarns 41-44 may be made from a monofilament nylon, while the machine direction yarns 32 may be made from either a monofilament or a multifilament nylon. One such yarn is shown in FIG. 4, where six nylon monofilaments 31 are twisted together to form yarn 32. It is also contemplated to substitute polyester yarns in place of the nylon yarns without detracting from the performance of the papermakers felt.

By way of example, in the intermediate layer 16, the cross machine direction yarns 41-44 each have a diameter of approximately 0.015 in., which is equivalent to a Tex count of 158. It is contemplated that the range for the cross machine direction yarns is from approximately 0.010 in. at 105 Tex to approximately 0.020 in. at 204 Tex. In addition, the machine direction yarns (e.g. yarn 32) is preferably a 6 ply version of yarn 31 with a Tex count of 250, wherein yarn 31 has a diameter of approximately 0.008 in. and a Tex count of 40. It is contemplated that yarn 32 may be replaced by a cabled multifilament yarn having an approximate range from a 3 ply, 840 denier to a 3 ply, 1260 denier with a 3 ply, 1050 denier nylon being preferred. The 3 ply 840 denier has a Tex equivalent of 295, the 3 ply 1050 denier, an equivalent of 372, and the 3 ply 1260 denier, an equivalent of 450.

In the intermediate layer, the machine direction yarns 32-35 and the cross machine direction yarns 41-44 are woven in accordance with any of the well-known weave patterns by employing a conventional endless weave process, with a reverse broken twill being preferred. It is contemplated to also produce the intermediate cloth 16 by the flat weave process, in which case, the fabric ends are subsequently joined by any well known method including hand joining.

As shown in FIG. 3, the cross machine direction yarns 41-44 appear to align themselves in spaced pairs 41-42, 43-44. This is caused by the manner in which the yarns are drawn through the reed in the weaving loom during the endless weave process. This pairing does not adversely effect the performance of the wet felt, but could be eliminated by only having one end per dent in a finer reed.

The top layer 18 comprises a batt or fleece of non-woven batting material such as synthetic fibers or blends of synthetic and wool fibers, which are customarily used in the manufacture of papermakers felt.

FIG. 7 shows, in diagrammatic form, a method by which the composite papermakers felt 10 is made. Initially, the two cloths constituting the bottom layer 12 and the intermediate layer 16 are separately woven. The two layers are then associated with each other so that the inner surface 50 of the intermediate layer 16 contacts the outer surface 52 of the bottom layer 12. The associating or positioning of the two layers takes place on a conventional fiber locker or needling machine 47 that has associated with it a conventional stretching device 45, such as a stretch rack of the type manufactured by Morrison Machine Company, New Jersey. The stretching device is employed in an operation wherein the two layers 12, 16 stretch under tension until the two layers are substantially the same length. When both of the cloths have achieved substantially the same length, the non-woven web 18 of synthetic fibers is needled into the two cloths through the use of the needling machine 44 having a series of barbs or needles 46 which initially penetrate through the top surface of the non-woven web 18 to accomplish the needling operation.

During the needling operation the bottom and intermediate layers 12, 16 are bound together by the fiber bundles which have been displaced from the top layer 18. The displaced fiber bundles penetrate the yarns and are carried through the interstices of both the intermediate and bottom layers by the action of the needles with some of the non-woven fibers appearing on the machine roll contacting surface.

The needling operation is continued until the bottom and intermediate layers are firmly fastened together, resulting in the composite three-layer papermakers wet felt 10. It is contemplated, depending on the desired softness and smoothness of the paper-receiving surface 20, that more than one layer of non-woven fiber be needled into the fabric and more than one needling operation may be performed. For example, some papermakers wet felts require a very dense hard needled paper-receiving surface. In this case, several additional needling applications without the addition of further non-woven fiber are necessary. Other wet felts require a lofty relatively loose paper-receiving surface. In this case, less needling passes with or without the addition of further non-woven fiber are necessary.

During the needling and joining operation, it is not necessary for the machine direction ribs 28 in the bottom layer 12 to assume a position in the composite cloth 10 in strict relationship to any machine direction yarns 32 in the intermediate layer. Through the means of the present invention, the papermakers felt functions efficiently on the paper machine notwithstanding the alignment between the ribs 28 of the bottom layer and the yarns 32 in the intermediate layer.

Although the present invention has been shown and described in terms of a specific preferred embodiment, it will be appreciated by those skilled in the art that changes or modifications are possible which do not depart from the inventive concepts described and taught herein. Such changes and modifications are deemed to fall within the purview of these inventive concepts.

What is claimed is:

1. A papermakers felt comprising:
    a first cloth woven from a first plurality of machine direction and cross machine direction yarns in accordance with a preselected weave pattern, said machine direction yarns being of greater diameter than said cross machine direction yarns, said first cloth defining alternating machine direction abrasion-resisting ribs and machine direction drainage grooves across the width of said first cloth, said ribs being formed by said machine direction yarns, with the frequency of said ribs and the widths of said grooves being determined by said weave pattern;
    a second cloth woven from a second plurality of machine direction yarns and cross machine direction yarns to define a plurality of drainage interstices, said second cloth being in surface contact with said first cloth; and
    a web of non-woven fiber in surface contact with said second cloth, select fibers of said web being displaced from said web and extending through said first and second cloths to hold said web and said first and second cloths together.

2. The papermakers felt of claim 1, wherein said first plurality of machine direction and cross machine direction yarns define a plain weave pattern.

3. The papermakers felt of claim 1, wherein said second plurality of machine direction and cross machine direction yarns define a reverse broken-twill pattern.

4. The papermakers felt of claim 1, wherein the yarns of said first and second cloths are synthetic yarns.

5. The papermakers felt of claim 1, wherein at least one of the cross machine direction yarns of said first cloth is spun polyester of fine count.

6. The papermakers felt of claim 1, wherein at least one of the machine direction yarns of said first cloth is bulky spun nylon.

7. The papermakers felt of claim 1, wherein at least one of the cross machine direction yarns of said second cloth is a monofilament.

8. The papermakers felt of claim 7, wherein said monofilament is chosen from the group consisting of nylon and polyester.

9. The papermakers felt of claim 1, wherein at least one of the machine direction yarns of said second cloth is a monofilament.

10. The papermakers felt of claim 9, wherein said monofilament is chosen from the group consisting of nylon and polyester.

11. The papermakers felt of claim 1, wherein at least one of the machine direction yarns of said second cloth is a multifilament.

12. The papermakers felt of claim 11, wherein said multifilament is chosen from the group consisting of nylon and polyester.

13. The papermakers felt of claim 1, wherein said machine direction yarns of said first cloth are essentially straight, with substantially all crimping taking place in the cross machine direction yarns of said first cloth.

14. A papermakers felt having a machine element contacting surface and a paper-receiving surface, said felt comprising:
- a bottom layer woven from a first plurality of machine direction and cross machine yarns in accordance with a preselected weave pattern, said machine direction yarns being of greater diameter than said cross machine direction yarns, said bottom layer defining said machine element contacting surface as a series of alternating machine direction abrasion-resisting ribs and machine direction drainage grooves across the width of said bottom layer, said ribs being formed by said machine direction yarns, with the frequency of said ribs and the widths of said grooves being determined by said weave pattern;
- an intermediate layer woven from a plurality of machine direction and cross machine direction yarns to define a plurality of drainage interstices;
- a top layer of non-woven material, said top layer defining said paper-receiving surface; and
- wherein select fibers of said top layer are displaced from said top layer and extend through said intermediate and bottom layers to hold said top, intermediate and bottom layers together.

15. The papermakers felt of claim 14, wherein said machine direction yarns of said bottom layer are substantially straight, with substantially all crimping taking place in said cross machine direction yarns of said bottom layer.

16. A papermakers wet felt of composite structure having a machine element contacting surface and a paper-receiving surface, said felt comprising:
- a first layer woven from a first plurality of machine direction and cross machine direction yarns, said machine direction yarns being of greater diameter than said cross machine direction yarns, said first layer defining said machine element contacting surface as alternating machine direction abrasion-resisting ribs and machine direction drainage grooves across the width of said first layer, said ribs being formed by said machine direction yarns, with the frequency of said ribs and the widths of said grooves being determined by said weave pattern;
- a second layer woven from a second plurality of machine direction and cross machine direction yarns, said second layer being in surface contact with said first layer, and defining a plurality of drainage interstices; and
- a third layer of non-woven fibers, said third layer being in surface contact with said second layer and defining said paper-receiving surface, select fibers of said third layer being displaced from said third layer and extending through said first and second layers to hold said three layers together.

17. The papermakers wet felt of claim 16, wherein said machine direction yarns of said first layer are substantially straight, with substantially all crimping taking place in said cross machine direction yarns of said first layer.

18. The papermakers wet felt of claim 16, wherein said third layer comprises a plurality of webs of non-woven batting material.

19. The papermakers wet felt of claim 16, wherein certain of said select fibers of said third layer pass through interstices formed by the yarns of at least one of said first and second layers, and wherein certain others of said select fibers penetrate the yarns of at least one of said first and second layers.

20. A method of making a papermakers felt comprising the steps of:
- providing a first cloth woven from a first plurality of machine direction and cross machine direction yarns, said machine direction yarns being of greater diameter than said cross machine direction yarns, said first cloth defining alternating machine direction abrasion-resisting ribs and machine direction drainage grooves across the width of said first cloth, said ribs being formed by said machine direction yarns;
- providing a second cloth woven from a second plurality of machine direction and cross machine direction yarns to define a plurality of drainage interstices;
- positioning a surface of said first cloth against a surface of said second cloth;
- positioning a surface of a non-woven web of batting fibers against the remaining surface of said second cloth; and
- performing a needling operation to cause select fibers of said non-woven web to be carried through said first and second cloths to firmly fasten said web and said first and second cloths into a composite structure.

21. The method of claim 20, wherein said first recited providing step includes the step of weaving said first cloth from said first plurality of machine direction and cross machine direction yarns in accordance with a preselected weave pattern.

22. The method of claim 20, wherein said second recited providing step includes the step of weaving said second cloth from said second plurality of machine direction and cross machine direction yarns.

23. The method of claim 20, wherein said first recited positioning step includes operating on said first and second cloths so that they are substantially the same length.

24. A method of making a papermakers felt comprising the steps of:
- weaving a first cloth from a plurality of machine direction and cross machine direction yarns, said machine direction yarns chosen to be of greater diameter than said cross machine direction yarns so that said first cloth defines alternating machine direction abrasion-resisting ribs and machine direction drainage grooves across the width of said first cloth, said ribs being formed by said machine direction yarns;
- weaving a second cloth from a second plurality of machine direction and cross machine direction yarns to define a plurality of drainage interstices;
- positioning said first cloth in surface contact with said second cloth;
- positioning a non-woven web of batting fibers in surface contact with said second cloth;
- performing a needling operation to cause select fibers of said non-woven web to be carried through said first and second cloths to firmly fasten said first and second cloths into a composite structure.

25. The method of claim 24, wherein said first recited weaving step includes maintaining said machine direction yarns of said first cloth substantially straight, with substantially all crimping taking place in said cross machine direction yarns of said first cloth.

26. The method of claim 24, wherein said first recited positioning step includes operating on said first and second cloths so that they are substantially the same length.

* * * * *